(No Model.)

H. BEZER.
NUT LOCK.

No. 534,850. Patented Feb. 26, 1895.

Witnesses:
Nicholas M. Goodlett
Asher Mayer

Inventor:
Henry Bezer
by his attorneys
Witter & Kenyon

UNITED STATES PATENT OFFICE.

HENRY BEZER, OF NEW ROCHELLE, NEW YORK.

NUT-LOCK.

SPECIFICATION forming part of Letters Patent No. 534,850, dated February 26, 1895.

Application filed June 30, 1894. Serial No. 516,173. (No model.)

*To all whom it may concern:*

Be it known that I, HENRY BEZER, a subject of the Queen of Great Britain, residing at New Rochelle, in the county of Westchester, State of New York, have invented certain new and useful Improvements in Bolts and Nuts, of which the following is a specification.

My invention relates to bolts and nuts, and it is designed especially to maintain, in conjunction with fish plates a firm, durable joint of the abutting ends of the rails of a railway.

The invention consists of the construction hereinafter set forth.

Figure 1:
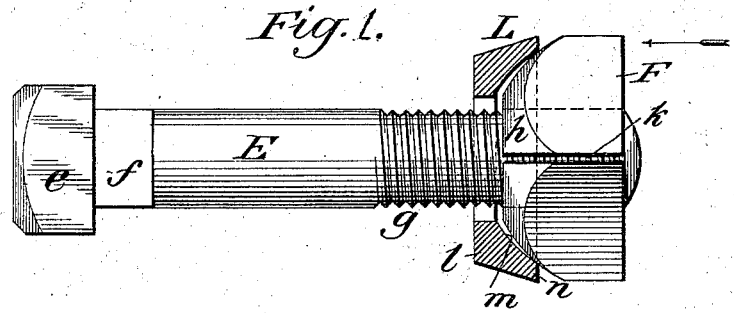
Figure 2:
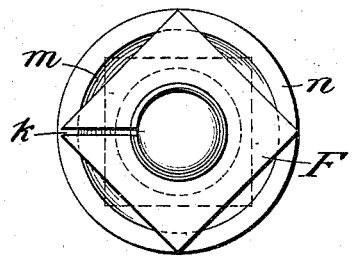
Figure 3:
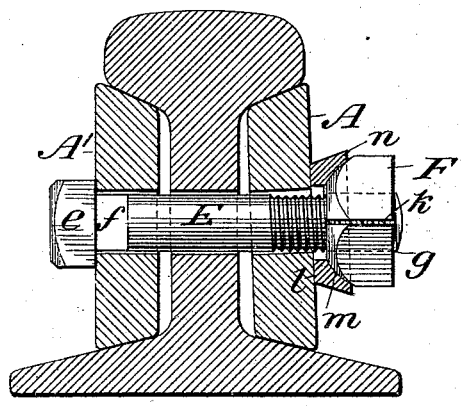

In the accompanying drawings illustrating my invention and in which like letters designate similar parts throughout the several views, Figure 1 is a side elevation of the bolt and nut, embodying my invention, the washer being in section. Fig. 2 is an end elevation of the bolt and nut looking in the direction of the arrow of Fig. 1. Fig. 3 is a transverse sectional elevation of a rail joint including my invention.

It is well known that there has been great difficulty in maintaining the rail joints of a railway firm and rigid, so as to effectually withstand the repeated strains put upon them by the passage of the cars. There was a constant tendency of the nuts to become loose on the bolts and finally to turn off. It was supposed that this loosening of the nut was due to its untwisting from close frictional contact with the fish plate caused by vibration incident to the passage of the cars and if means should be devised to prevent the nut from turning when once firmly seated on the bolt against the fish plate the rail joint would remain firm. Examination, however, has revealed the fact that this is not the case. Even where the nut remained firmly fixed on its bolt it has been found that in a short time the nut was no tfirm against the fish plate and the nut had to be screwed home again to tighten the joint. Subsequent examination showed, however, that the nut was again loose from the fish plate although it might still be tight on the bolt. Finally after repeatedly tightening the nut down against the plate the bolt in many cases broke. Careful examination and tests have shown me that the first cause of the nut losing its grip on the fish plate is the stretching of the bolt occasioned by the pounding action of the passing cars. This stretching is not ordinarily due to an actual increase in the length of the bolt beyond its normal length, but is due rather to a straightening of the bolt after having been bent in the operation of screwing home the nut. I have found that the bolt is liable to be thus bent during the act of forcing home the nut whenever there is not a true and equal bearing of the wearing faces of the nut and head of the bolt against the fish plates and that an untrue and unequal bearing of these faces is often due to the fact that the fish plates do not stand in parallel vertical planes when embedded between the treads and bases of the rails, or to the fact that the nut has the axis of its aperture inclined to its wearing face, or to the fact that the head of the bolt has its wearing face inclined to the shank of the bolt. When the bolt has from either of these or other causes been bent in forcing home the nut, the pounding action of the passing cars will straighten the bolt and loosen the nut.

My invention provides means whereby the nut is always normally seated firmly and evenly against its fish plate and whatever may be the conditions there is no bending of the bolt or laceration of the threads.

Referring now to Figs. 1, 2 and 3, illustrating my invention, the bolt E is provided with a head $e$, square shoulder $f$ and screw threads $g$. The nut F is made with a rounded or ball face $h$ and is provided with a radial slot $k$ extending through to the screw threaded aperture. The aperture of the nut is preferably made slightly smaller in diameter than the diameter of the threaded end of the bolt and when screwed home on the bolt the slot $k$ permits the aperture to expand so as to make a tight fit, the threads of the bolt and nut meshing fully and firmly together. The washer L fits loosely on the bolt and has on one side a flat face $l$ and on the other side a cup face $m$ adapted to receive and fit the ball face of the nut. The cup is designed to receive and accurately fit the nut, but it is practically quite difficult to economically make them so that they will accurately fit without subsequent adjustment. In order to provide for this adjustment I make the diameter of the ball face of the nut normally to exceed in a slight degree the diameter of the cup of the washer, so that when brought together the nut does not fit snugly into the bottom of the cup without heavy strain. When proper pressure is applied the circular wall $n$ of the cup, which is gently tapered from the bottom of the cup outward, expands sufficiently to allow the ball face of the nut to sink fully into the bottom of the cup, as seen in Fig. 3. At the same time this pressure serves to bind more firmly the nut upon the bolt in case the nut is not normally tight fitting. I prefer, however, to make the aperture of the nut normally slightly smaller than the bolt, so that the nut must expand in being driven home on the bolt. This makes a tight fit and a full accurate intermeshing of the threads of the bolt and nut, such that the nut can not be turned by hand, and will not be turned by vibration incident to passing cars.

Fig. 3 shows the plate A slightly inclined, the washer L fitting with its flat face flush against the plate. In forcing the nut home on the bolt the ball face of the nut bears equally on all sides upon the wall of the cup and has no tendency to bend the bolt. A heavy strain of the spanner upon the nut forces the cup to expand, and the ball face of the nut embeds itself fully and accurately within the cup of the washer. The nut however is slightly tilted in the cup owing to the inclined position of the fish plate and washer. Whatever may be the inclination of the plate A and washer, within practical limits, the nut will be firmly and solidly held against the plate, the cup and nut adjusting themselves to suit the conditions. A passing train, in straining the plate A outward against the nut strains the bolt equally in the direction of its length and has no tendency to bend it. The tight fit of the nut upon the bolt prevents their intermeshed threads from stretching and as the shank of the bolt is too strong to stretch the joint remains intact with the washer firmly and rigidly seated against the plate and the nut firmly and rigidly seated within the washer.

While I have described my invention as especially applicable to rail joints, it is of course capable of general application. The bolt and nut, which are preferably threaded as shown, might in some cases be made smooth, the nut being forced home and held there by upsetting the end of the bolt. The bolt in some cases might moreover be made without a head, being made in the form of a stud, or the bolt might have the ball faced nut and washer applied to both ends. Again it is obvious that in some cases the head might be made ball-faced and provided with a cup washer, the nut being of the common type or not as desired.

Various changes which will suggest themselves to any one skilled in the art might be made without departing from the spirit of my invention.

What I claim as new, and desire to secure by Letters Patent, is—

1. The combination of a bolt, a ball faced head or nut therefor, a washer fitting loosely on the bolt provided on one side with a cup face adapted to receive the ball face of the head or nut, the diameter of the ball face slightly exceeding the normal diameter of the cup of the washer, and the cup expanding under heavy strain so as to accurately fit the ball face of the head or nut, substantially as set forth.

2. The combination of a bolt, a ball faced nut therefor provided with a radial slot extending from face to face of the nut and to the aperture thereof, a washer fitting loosely on the bolt and having a cup face adapted to receive and fit the ball face of the nut, substantially as set forth.

3. The combination of a bolt, a normally tightly fitting ball faced nut therefor provided with a radial slot extending from face to face of the nut and to the aperture thereof, a washer fitting loosely on the bolt and having a cup face adapted to receive and fit the ball face of the nut, substantially as set forth.

4. The combination of a bolt, a ball faced nut therefor provided with a radial slot extending from face to face of the nut and to the aperture thereof, a washer fitting loosely on the bolt and having on one side a substantially flat wearing face and on the other side a cup face adapted to receive and fit the ball face of the nut, substantially as set forth.

5. The combination of a bolt, a ball faced nut therefor provided with a radial slot extending from face to face of the nut and to the aperture thereof, a washer fitting loosely on the bolt and having a cup face adapted to receive and fit the ball face of the nut, the diameter of the ball face of the nut slightly exceeding the normal diameter of the cup of the washer, the cup expanding under heavy strain so as to accurately fit the nut, substantially as set forth.

6. The combination of a bolt, a normally tightly fitting ball faced nut therefor provided with a radial slot extending from face to face of the nut and to the aperture thereof, a washer fitting loosely on the bolt and having a cup face adapted to receive and fit the ball face of the nut, the diameter of the ball face of the nut slightly exceeding the normal diameter of the cup of the washer, the cup expanding under heavy strain so as to accurately fit the nut, substantially as set forth.

7. The combination of a bolt, a normally tightly fitting ball faced nut therefor provided with a radial slot extending from face to face of the nut and to the aperture thereof, a washer fitting loosely on the bolt and having on one side a substantially flat wearing face and on the other side a cup face adapted to receive and fit the ball face of the nut, substantially as set forth.

8. The combination of a bolt, a normally tightly fitting ball faced nut therefor provided with a radial slot extending from face to face of the nut and to the aperture thereof, a washer fitting loosely on the bolt and having on one side a substantially flat wearing face and on the other side a cup face adapted to receive and fit the ball face of the nut, the diameter of the ball face of the nut slightly exceeding the normal diameter of the cup of the washer, the cup expanding under heavy strain so as to accurately fit the nut, substantially as set forth.

In testimony whereof I have signed my name to this specification in the presence of two subscribing witnesses.

HENRY BEZER.

Witnesses:
NICHOLAS M. GOODLETT, Jr.,
GEORGE W. MILLS, Jr.